United States Patent
Weiss et al.

(10) Patent No.: US 8,453,680 B2
(45) Date of Patent: Jun. 4, 2013

(54) DAMPING ELEMENT FOR DECOUPLING ELEMENTS, IN PARTICULAR FOR MEMBRANE BELLOWS

(75) Inventors: Matthias Weiss, Hilchenbach (DE); Karl-Heinz Münker, Hilchenbach (DE); Dietmar Baumhoff, Olpe (DE); Andreas Gerhard, Wenden (DE); Karsten Schenk, Schwalmstadt (DE); Michael Henkelmann, Hilchenbach (DE); Oliver Selter, Finnentrop (DE); Stefan Hauk, Hilchenbach (DE)

(73) Assignee: Westfalia Metallschlauchtechnik GmbH & Co. KG, Hilchenbach (DE)

( * ) Notice: Subject to any disclaimer, the term of this patent is extended or adjusted under 35 U.S.C. 154(b) by 480 days.

(21) Appl. No.: 12/872,395

(22) Filed: Aug. 31, 2010

(65) Prior Publication Data
US 2011/0209790 A1 Sep. 1, 2011

(30) Foreign Application Priority Data
Aug. 31, 2009 (DE) .................. 10 2009 039 300

(51) Int. Cl.
*F16L 9/18* (2006.01)
(52) U.S. Cl.
USPC ........... 138/121; 138/173; 138/122; 138/114; 138/113; 285/47; 285/49
(58) Field of Classification Search
USPC .................. 138/121, 122, 173, 114
See application file for complete search history.

(56) References Cited

U.S. PATENT DOCUMENTS

| | | | | |
|---|---|---|---|---|
| 4,659,117 A | * | 4/1987 | Holzhausen et al. | 285/49 |
| 5,506,376 A | * | 4/1996 | Godel | 181/208 |
| 5,967,565 A | * | 10/1999 | Kim | 285/49 |
| 5,992,896 A | * | 11/1999 | Davey et al. | 285/49 |
| 6,062,266 A | * | 5/2000 | Burkhardt | 138/114 |
| 6,848,478 B2 | * | 2/2005 | Nagai | 138/112 |
| 7,451,785 B2 | * | 11/2008 | Taira et al. | 138/118 |
| 7,748,749 B2 | * | 7/2010 | Baumhoff et al. | 285/49 |
| 2003/0137147 A1 | * | 7/2003 | Girot et al. | 285/47 |
| 2008/0012297 A1 | * | 1/2008 | Heil et al. | 285/226 |
| 2011/0074147 A1 | * | 3/2011 | Thomas et al. | 285/226 |
| 2012/0056414 A1 | * | 3/2012 | Thomas et al. | 285/49 |
| 2013/0015652 A1 | * | 1/2013 | Thomas et al. | 285/47 |

FOREIGN PATENT DOCUMENTS

| | | |
|---|---|---|
| DE | 29707908 U1 | 5/1997 |
| DE | 19924476 A1 | 12/1999 |
| DE | 20302657 U1 | 2/2003 |
| DE | 20302659 U1 | 2/2003 |

(Continued)

*Primary Examiner* — Patrick F Brinson
(74) *Attorney, Agent, or Firm* — Henry M. Feiereisen LLC

(57) ABSTRACT

A decoupling element for a conduit includes an interior hose made of metal and a corrugated exterior hose surrounding the interior hose, with a hollow-cylindrical gap formed between the corrugated exterior hose and the interior hose. At least one damping element is arranged in the gap, with the damping element(s) constructed of a woven fabric made of a high-temperature-resistant material and having an outside surface with at least one bulge, wherein the bulge positively engages with a corrugation of the exterior hose. The exterior hose may be a membrane bellows. The woven fabric may be a metallic material. The at least one damping element covers, along the rotation axis, preferably a proportional length of at least 20% of the hollow-cylindrical gap and has preferably a static stiffness in the radial direction of less than 100 N/mm.

18 Claims, 4 Drawing Sheets

FOREIGN PATENT DOCUMENTS

| | | |
|---|---|---|
| DE | 202005016980 U1 | 10/2005 |
| DE | 202006012761 U1 | 8/2006 |
| DE | 202007009054 U1 | 6/2007 |
| DE | 102008028767 A1 | 3/2008 |
| DE | 102007002636 A1 | 7/2008 |
| DE | 102008001297 A1 | 10/2008 |
| DE | 102007043944 A1 | 3/2009 |
| DE | 102008017598 A1 | 10/2009 |
| EP | 1967783 A1 | 9/2008 |

* cited by examiner

DAMPING ELEMENT FOR DECOUPLING ELEMENTS, IN PARTICULAR FOR MEMBRANE BELLOWS

CROSS-REFERENCES TO RELATED APPLICATIONS

This application claims the priority of German Patent Application, Serial No. 10 2009 039 300.5, filed Aug. 31, 2009, pursuant to 35 U.S.C. 119(a)-(d), the content of which is incorporated herein by reference in its entirety as if fully set forth herein.

BACKGROUND OF THE INVENTION

The present invention relates to a damping element for arrangement in a corrugated exterior hose. The invention also relates to a decoupling element for conduits, in particular exhaust gas conduits for motor vehicles, which includes a damping element of this type.

The following discussion of related art is provided to assist the reader in understanding the advantages of the invention, and is not to be construed as an admission that this related art is prior art to this invention.

Decoupling elements, which are arranged, for example, in motor vehicles between the motor and the downstream sections of the exhaust gas system, frequently include a coaxial arrangement formed of an interior hose and an exterior hose. It is known that noise resulting from contact between these hoses can be eliminated by arranging a hose or ring made of woven metal between the interior hose and the exterior hose.

In one prior art device for eliminating resonances, housings having additional masses are mounted radially on the outside circumference. In another prior art damping mechanism, an unwanted frequency is removed by superimposing an oscillation with an opposite phase from a Helmholtz resonator. Other conventional damping mechanisms employ springs or a woven metal hose or a woven metal ring which are frictionally coupled to the outside structure of the metal bellow.

These conventional systems suffer from material fatigue. It would therefore be desirable and advantageous to provide an improved damping element to obviate prior art shortcomings and to increase the service life of metal hose assemblies, in particular metal hose assemblies used in decoupling elements for exhaust gas conduits of motor vehicles.

SUMMARY OF THE INVENTION

According to one aspect of the present invention, a damping element is configured for arrangement in a corrugated exterior hose. The damping element includes a woven fabric made of a high-temperature-resistant material, wherein the outside surface of the woven fabric (i.e., the surface disposed radially outside when installed in an exterior hose) has at least one bulge which engages or fits in a corrugation of the exterior hose.

The complete damping element frequently consists of the woven fabric; however, it may also include other components, for example form-stabilizing scaffolds.

According to another aspect of the invention, a decoupling element for conduits, in particular for exhaust conduits of automobiles, includes the following components:

An interior hose made of metal. This can be, for example, a wound metal hose, in particular with hooked or agraffe-type links.

A corrugated exterior hose which surrounds the interior hose coaxially with a radial spacing therebetween.

At least one damping element of the afore-described type arranged in the gap between the interior hose and the exterior hose, which includes a woven fabric made of a high-temperature-resistant material, which has on its outside surface at least one bulge which positively engages in a corrugation of the exterior hose.

The afore-described damping element and the associated decoupling element advantageously enable or exhibit positive coupling between the woven fabric of the damping element and the exterior hose. Surprisingly, it has been observed in practical applications that such arrangement significantly extends the service life under typical (vibration) loads, while simultaneously attaining excellent damping of natural oscillations of the hose system.

For example, the exterior hose may be, in particular, a metal bellow, most preferred a membrane bellow. Metal bellows are frequently used in decoupling elements of exhaust gas conduits, because they provide a highly flexible, gas-tight connecting structure. A "membrane bellow" is here a metal bellow which is not constructed from a single-piece pipe, but is composed of individual ring elements and/or a wound band. The stiffness of metal bellows and in particular membrane bellows is typically less than 10 N/mm, i.e. very small. However, the damping element of the invention can be used successfully to sufficiently dampen natural vibrations of such metal bellows.

The bulge or bulges of the damping elements can generally have any form and/or arrangement. According to a preferred embodiment, the at least one bulge is constructed to extend peripherally at least partially about the axis of the exterior hose. Depending on the corrugations in the exterior hose, a complete (360°) revolution of the bulge can here be closed in form of a ring or a progressive spiral complementary to the exterior hose. The revolution of the bulge may extend over a limited angle, for example 45° (quarter circle), or may make of one or several revolutions. Likewise, the bulge may optionally extend in the axis direction over a portion or over the entire length of the exterior hose.

While the shape of the damping element and in particular the shape and arrangement of the bulges may generally be arbitrary and/or irregular, the damping element is at least in some sections rotationally symmetric.

In addition, the damping element may in its basic shape be essentially cylindrical, wherein the cylindrical shape is then adapted to the shape of the exterior hose (typically circular, but polygonal or other cylinder cross sections are also possible). If the damping element itself is not dimensionally stable (which may frequently be the case), then the term "cylindrical shape" is meant to indicate that the damping element can be (reversibly) transformed into such shape.

Moreover, the damping element may preferably have a pretension with respect to the interior hose and/or with respect to the exterior hose. This may be achieved by making the inside diameter of the damping element slightly smaller than the outside diameter of the interior hose, or by making the outside diameter of the damping element slightly greater than the inside diameter of the exterior hose. The pretension further enhances the stability of the seat of the damping elements on the exterior hose and interior hose, respectively.

Advantageously, to attain an adequate damping effect, the damping element (or the sum of the damping elements, if several damping elements are provided) may extend over at least 20% of the axial length of the exterior hose.

Advantageously, the decoupling element according to the invention includes two or more separate damping elements, which are distributed in the axial direction. This arrangement can be optimized based on technical vibration considerations.

For example, damping elements may be provided preferably in zones of maximal vibrations.

According to another advantageous embodiment of the decoupling element, at least one damping element is arranged on an axial end of the decoupling element. This may be, in particular, the end facing the engine during installation, where the vibrations to be damped are introduced into the decoupling element.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
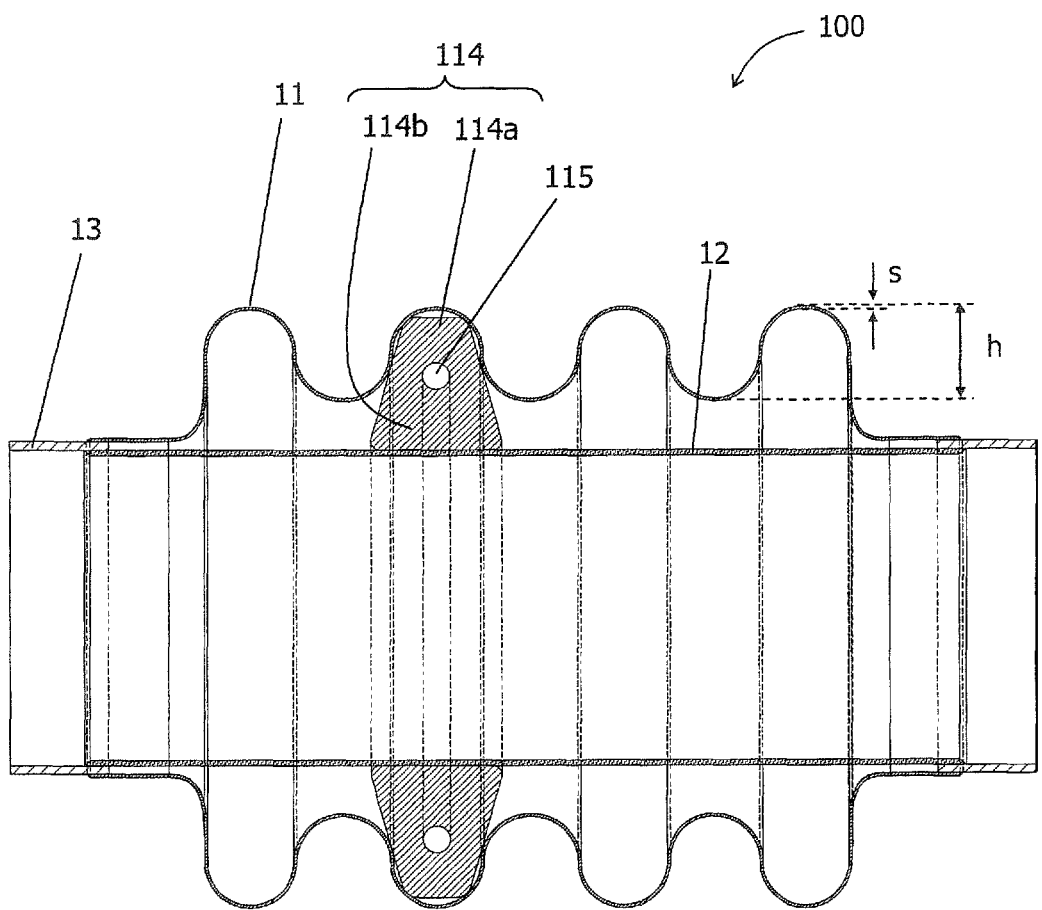
FIG. 1 shows a cross-section through a first embodiment of the decoupling element with an interior hose, an exterior hose and a ring-shaped first damping element.

Throughout all the figures, same or corresponding elements may generally be indicated by same reference numerals. Identical reference symbols or reference symbols that differ by a multiple of 100 refer to identical or similar components in the Figures. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In this context, the term "woven fabric" is defined generally a regular or irregular arrangement of filament- or fiber-shaped elements, for example metal wires. Due to its structure which includes many intermediate spaces and bends of the filaments/fibers, the relative movement and friction between the individual filaments/fibers produces a woven fabric with relatively high elasticity and excellent damping properties.

"Bulging" of the damping elements refers generally to a material accumulation of the woven fabric which extends beyond a reference plane of the outside surface, wherein the reference plane is typically the surface of a cylinder having a radius approximately equal to the inside radius of the exterior hose. With the arrangement of the damping elements in the corresponding exterior hose, the bulging can hence protrude into a corrugation of the exterior hose.

Moreover, "high-temperature-resistant material" refers to a material which can withstand long-term temperatures of about 200° C., in particular of more than about 400° C. without undergoing a permanent change and/or without a loss in functionality.

While the actual dimensions of the damping element depend on the exterior hose for which it is intended, its general shape is independent of the associated exterior hose. Only corrugation of the exterior hose is required as an essential property for the damping element. An exterior hose is referred to as "corrugated", if its surface has depressions and raised portions ("corrugations") which represent a deviation from a purely cylindrical shape. The corrugations typically revolve circumferentially in a ring-shape or helical-shape.

The invention will now be described with reference to an exemplary damping element for membrane bellows. The latter are part of the group a flexible conduit elements and are characterized by their low stiffness and the ratio of root face to wall thickness.

The stiffness of membrane bellows, which is generated from the ratio of root face to wall thickness, is typically less than 10 N/mm. The ratio between the root face (h) and the wall thickness (s) is always greater than 33.33 (h/s>33.33). In the manufacture of membrane bellows, ring-shaped metal blanks with an inward indentation are joined, similar to leaf spring assemblies, by interior and exterior weld seams. More recent processes use only one weld seam on the outside. In addition to a conventional membrane bellow with its rotationally symmetric structure and a discontinuous welding process, helical membrane bellows produced by a continuous welding process also exist.

Metal bellows, in particular membrane bellows, are used to compensate installation tolerances and thermal expansion and to decouple operating vibrations in conduit systems; for this reason, they are also called decoupling elements. Preferably, the aforedescribed inventive component is used in exhaust gas systems in passenger cars and trucks.

Movements with superimposed vibrations are produced in the exhaust gas system of motor vehicles, for example, by imbalances of rotating elements in the motor, turbo or ancillary aggregates. Vibrations can also be excited by the pulse-shaped pressure curves of the internal combustion engine having RPM-dependent periods. These vibrations reach the exhaust gases than via the valves and the associated controls. In addition to these higher-frequency vibrations, frequencies in the single digit or low two digit Hertz region can be excited by driving-related movements in connection with an uneven road surface which are fed back into the suspension.

Flexible conduit elements are intended to decouple the movements induced into the exhaust gas system, including the superimposed vibrations. Relevant are here, in addition to the mechanical and dynamical frequency bands, also acoustic frequencies emitted by the structure-borne noise, which can in special situations extend into the frequency range of 5000 Hz.

Membrane bellows in exhaust gas systems are made of metallic materials to withstand the high exhaust gas temperature. Their vibration characteristic is therefore determined by their masses and spring stiffness.

The elements transporting the gas are frequently metal bellows with corrugations formed symmetrically with respect to the rotation axes or bellow-shaped geometries which a helical contour on the outside circumference. During operation, the vibrations induced in the exhaust gas system can introduce natural frequencies in the flexible conduit elements. The inherent shapes associated with low natural frequencies of metal bellows having corrugations which are symmetric with respect to the rotation axis are frequently standing longitudinal waves in the bellow structure, wherein the number of vibration nodes of the longitudinal waves increases with the order of the natural frequency. The high-frequency limit of these natural frequencies decreases with decreasing stiffness. The natural frequencies of such components typically decrease with increasing diameter and length. The use of metal bellows without damping elements adapted to the special configuration does not show potential in particular for trucks, where the diameters and lengths of the flexible conduit elements are larger due to the size of the overall system.

Because future global regulatory requirements will likely require a significant reduction in the pollutant emission from trucks, future exhaust gas systems will increasingly require secondary treatment modules, such as soot particle filters and SCR systems. The assemblies for secondary treatment of exhaust gases further restrict the installation space available in the truck, so that minimizing the installation space for each installed element, including the flexible conduit element, is an important design criterion. The required minimum service life also increases significantly.

The requirement for minimizing the installation space for the entire system can be satisfied by designing the flexible conduit element with the smallest possible static as well as dynamic stiffness, which can be preferably satisfied with membrane bellows. This has also the advantage that a small static stiffness with existing installation tolerances for the conduit system also results in small pretension forces and accompanying small structural tension in the decoupling element.

For the aforementioned reasons, an element is desirable which in conjunction with an exterior membrane bellow and an interior flexible conduit element produces a damped system which provides adequate decoupling of the operating vibrations with the smallest possible installation space, adequate inherent stability and a long service life. A simple and reliable assembly of the element with the flexible conduit element is also desirable.

Turning now to the drawing, and in particular to FIG. 1, there is shown an interior positively connected damping element 114. The associated damped flexible conduit system 100 has an exterior membrane bellow 11 and an interior flexible conduit element 12 which are connected in the end regions by a positive, non-positive or material connection to a metallic connecting element 13.

The damping element 114 is essentially constructed from a woven metal fabric and includes a bulge 114a configured for engagement with a corrugation of the membrane bellow 12. As illustrated in the Figure, the woven fabric of the damping element 113 can optionally be arranged in a composite structure with an interior stabilizing metal core 115.

Figure 2:
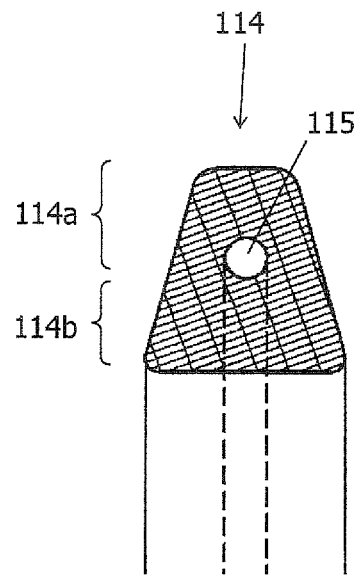
FIGS. 2-4 show cross-sections through three different embodiments of ring-shaped damping elements.
Figure 3:
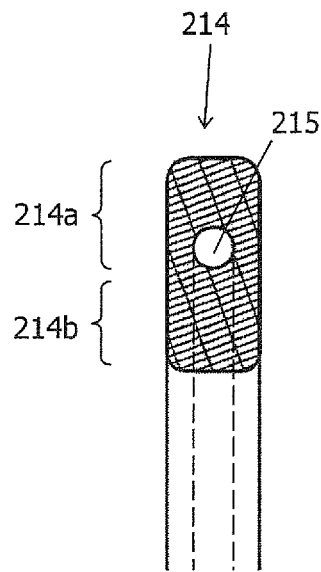
Figure 4:
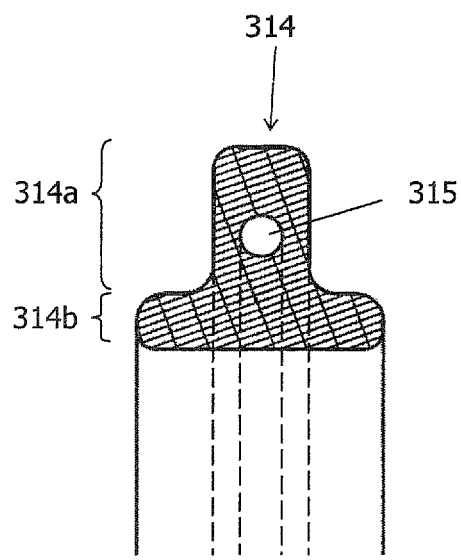
Figure 5:
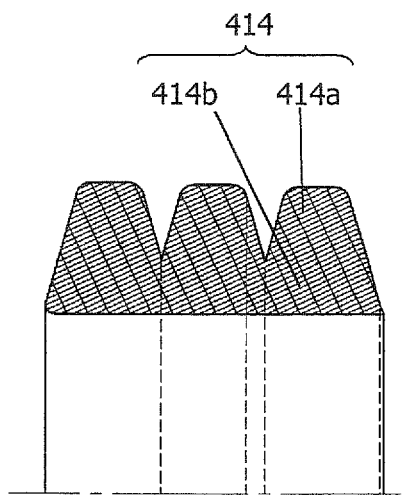
FIGS. 5-8 show cross-sections through four different embodiments of cylindrical damping elements.
Figure 6:
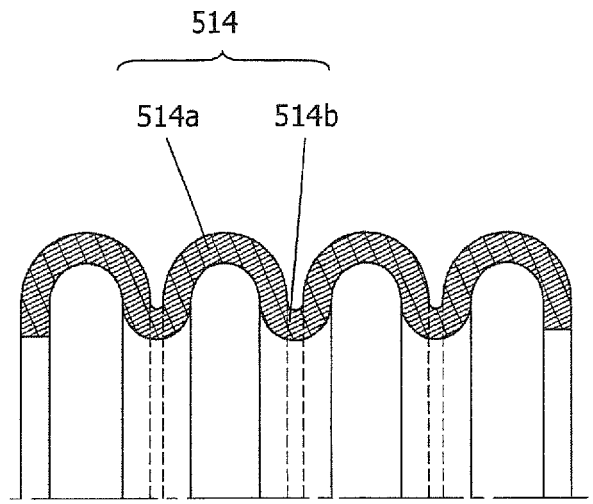
Figure 7:
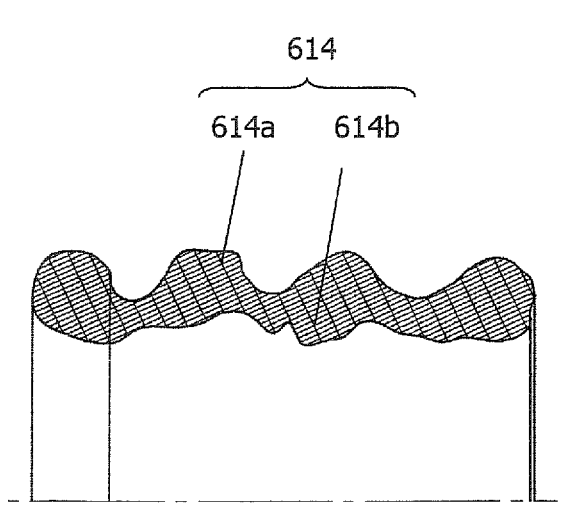
Figure 8:
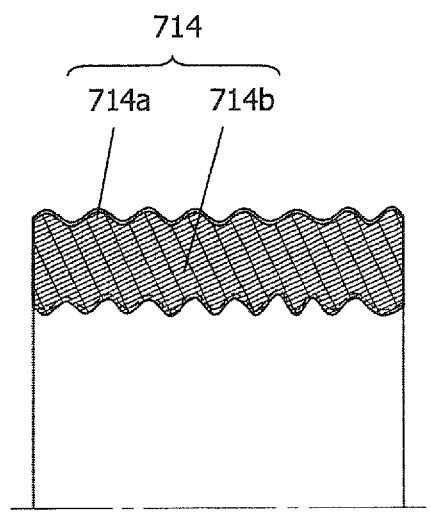

FIGS. 2 to 4 show different cross-sectional geometries of the damping element which are characteristic for the application and which can be implemented as a ring, a ring segment or a band, either radially circumferentially or helically. They are positioned in the space between the membrane bellow 11 and the flexible conduit element 12 in one or more regions (corrugations of the membrane bellow 11), depending on the degree of damping. Both a positive or frictional contact between the damping element, the membrane bellow and the flexible conduit element can be implemented. While the aforementioned Figures each show damping elements with a metal core 115, 215 and 315, respectively, the damping elements may optionally also be implemented without a metal core (not illustrated).

The shape contour of the damping element may, in addition to the illustrated trapezoidal cross-sectional geometry of the damping element 114 (FIG. 2), also include, for example, rectangular cross-sectional shapes 214 (FIG. 3) or T-shaped cross-sectional shapes 314 (FIG. 4), however, always in such a way that the damping element is in contact with both the membrane bellow and the flexible conduit element in one or more regions, wherein the woven fabric projects with a bulge (114a, 214a, 314a) radially into corresponding interior corrugations of the bellow structure which is disposed exteriorly on the flexible conduit element.

As illustrated in FIGS. 5 to 8, several damping elements 414, 514, 614, 714 can also be installed consecutively. This type of structure is also referred to as a damping cushion and can be implemented with a woven metal ring, which was shaped by a forming process. Both square shapes (damping element 414 of FIG. 5) as well as rounded shapes (damping element 514 of FIG. 6) can be produced and employed. The cross-sectional contour of the damping elements can also include other types of shaped elements, such as irregular (damping element 614 of FIG. 7) or sinusoidal (damping element 714 of FIG. 8).

The interior space between the membrane bellow 11 and the conduit element 12 can be equipped with the damping element over the entire length of the conduit element or over part of the length, to dampen system-related natural frequencies.

The damping element can optionally be positioned and affixed with the help of a metal core 115-315. The metal core 115-315 applies on the interior flexible conduit element 12 an additional pretension of the damping elements, which is specific for each application and independent of wear. This extends the service life of the decoupling system.

Figure 9:
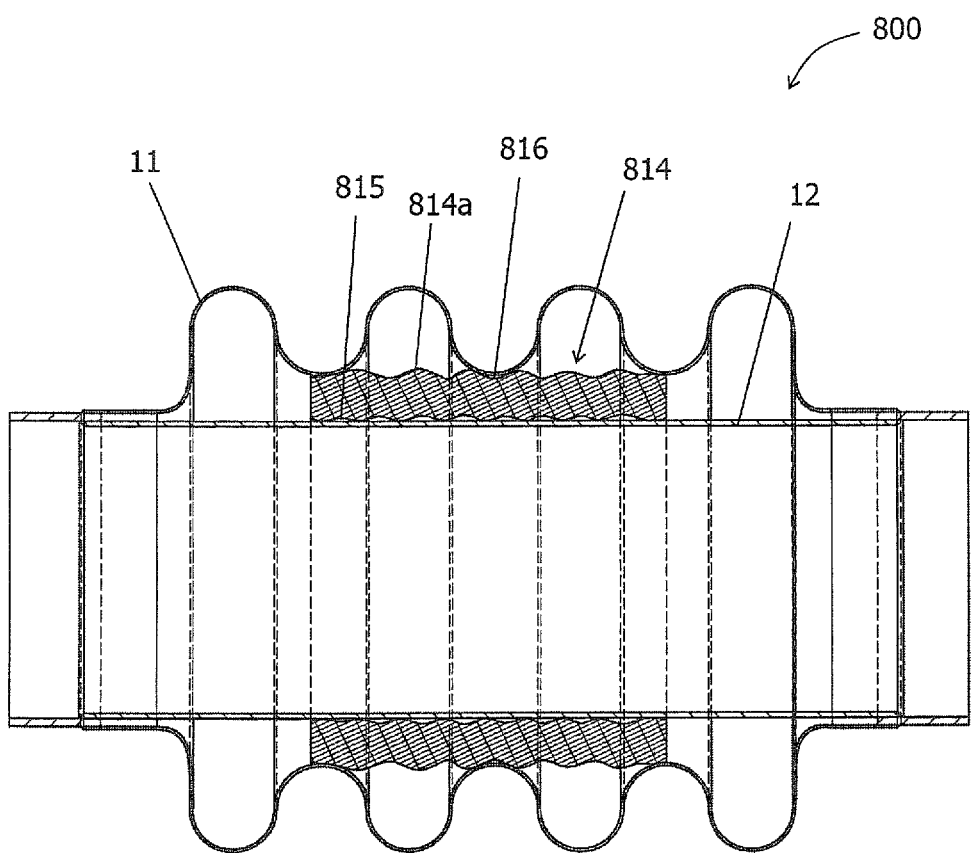
FIG. 9 shows a cross-section through a second embodiment of the decoupling element with an interior hose, an exterior hose and a cylindrical damping element.

FIG. 9 shows in an additional exemplary embodiment a system 800 made of an exterior metal bellow 11, with corrugations arranged symmetrically with respect to the rotation axis, and an interior flexible conduit element 12, wherein the damping element 814 is positively connected but has an irregular structure, making contact with both the metal bellow and the flexible conduit element at least one location 816. Both the axial pretension and the material connection 815, which is produced by welding or brazing and applied at least once along the circumference, can be employed for positioning in the longitudinal direction.

There damping elements 414-814 of FIGS. 5 to 9 may optionally include a metal core (not illustrated).

Depending on the dynamic design of the entire system, the damping element may be employed both in rotationally symmetric membrane bellow structures (FIGS. 2-4) as well as in helical membrane bellow structures, wherein in the latter case the damping element has a pitch so that the contour of the metal fabric makes partial or continuous positive contact on the interior corrugations of the membrane bellow structure.

The outside diameter of the non-pretensioned damping element is preferably greater than the unobstructed width of the membrane element. The inside diameter of the non-pretensioned damping element is preferably smaller than the outside diameter of the interior metal hose. The employed woven metal fabric can be constructed as a single layer or as several layers and can also be made of composite materials. The following exemplary materials are suitable for the damping element at high temperatures; however, the list is not exhaustive:

woven elements made of stainless steel fibers and graphite fibers;
woven elements made of stainless steel fibers and absorbent fibers, on which a graphite deposit is formed by immersion in a liquid;
precursor-coated fabric, wherein the base material is aluminum oxide;
precursor-coated fabric, wherein the base material is glass-like;
a pre-ceramic polymer of solid, paste-like or foam-like consistency;
a fiber-reinforced woven fabric made of graphite tape;
metal-textile composite materials;
needle-punched non-woven material;
textured E-glass;

fabric made of ceramic fibers, temperature-resistant support fibers and strength-enhancing stainless steel wires; polycrystalline or hybrid expanded mats.

Combinations of the aforementioned intermediate materials may also be particularly suited for special applications. In a preferred embodiment, damping elements exposed to high temperature are made of small-mesh-size woven fabrics.

In other exemplary embodiments, combinations of the aforedescribed shape, material and position variants can be implemented. These can be used as damping element either in the field of exhaust gases systems or in technologically similar fields. Possible additional fields of application are, for example, but not exclusively, stationary motors and turbines, power plants and HVAC systems.

While the embodiments illustrated in the Figures show only a single damping element for each decoupling element, tests have shown that advantageously several damping elements, for example two or three damping elements, may be used.

In addition, a damping element is preferably arranged directly on the engine-side end of the decoupling element, i.e., at the source of the introduced vibrations.

Optional properties of the damping element according to the invention and of the decoupling system will now be summarized once more in the following listing:

- At least one metallic woven material is arranged in the hollow-cylindrical gap between an interior flexible metal hose and an exterior bellow structure and a covers along the rotation axis a proportionate length of at least 20% of the hollow-cylindrical gap.
- A positive, non-positive and/or frictional contact exists between the damping element and the interior flexible metal hose as well as between the damping element and the exterior bellow structure, which can also be produced by other shapes.
- The outside diameter of the non-pretensioned damping element is at least 2.7% greater than the unobstructed width of the membrane element.
- The inside diameter of the non-pretensioned damping element is at least 3.4% small than the outside diameter of the flexible conduit element.
- In the operating range, the static radial stiffness of the damping element is less than 100 N/mm.
- The cross-sectional geometry has specific for each application undulating, trapezoidal, sinusoidal, triangular and/or rectangular contours.
- The damping element is helical or rotationally symmetric.
- The damping element is constructed as a single layer or as multiple layers.
- The layers of the damping element can be made of different materials.
- The position of the damping element is maintained by at least one material connection, positive connection and/or non-positive connection with the connecting structure.
- The position of the damping element is fixed by a defined radial pretension.
- The damping element is constructed in sections rotationally symmetric and radially revolving.
- The damping element is constructed in sections radially revolving with a pitch.
- The contact regions on the damping element are point-shaped, line-shaped and/or extend across a two-dimensional area.
- The material of the damping element contains or is made of: woven stainless steel fibers; woven graphite fibers; woven absorbent fibers, with a deposit being formed by immersion in a liquid; precursor-coated fabric, with the base material being aluminum oxide or glass-like; pre-ceramic polymer having a solid, paste-like or foam-like consistency; fiber-reinforced woven fabric of graphite tape; a metal-textile composite material; needle-punched non-woven material; a textured E-glass non-woven material; ceramic temperature-resistant support fibers and strength-enhancing stainless steel wires.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A damping element constructed for arrangement in a corrugated exterior hose, the damping element comprising a woven fabric made of a high-temperature-resistant material and having an outside surface with at least one bulge, said bulge engaging with a corrugation of the exterior hose.

2. A decoupling element for a conduit, comprising:
    a) an interior hose made of metal;
    b) a corrugated exterior hose surrounding the interior hose, with a gap formed between the corrugated exterior hose and the interior hose; and
    c) at least one damping element arranged in the gap and comprising a woven fabric made of a high-temperature-resistant material and having an outside surface with at least one bulge, said bulge positively engaging with a corrugation of the exterior hose.

3. The decoupling element of claim 2, wherein the conduit is an exhaust conduit for a motor vehicle.

4. The decoupling element of claim 2, wherein the interior hose is a wound metal hose.

5. The decoupling element of claim 2, wherein the exterior hose is a metal bellow.

6. The decoupling element of claim 5, wherein the exterior hose is a membrane bellow.

7. The decoupling element of claim 2, wherein the bulge is formed to extend at least partially circumferentially about an axial direction of the exterior hose.

8. The decoupling element of claim 2, wherein the damping element is at least in sections rotationally symmetric or substantially cylindrical.

9. The decoupling element of claim 2, wherein the damping element comprises a metal core.

10. The decoupling element of claim 2, wherein the damping element is pretensioned with respect to the interior hose or the exterior hose, or both.

11. The decoupling element of claim 2, wherein the damping element comprises at least one material selected from the group consisting of:
    woven elements of stainless steel fibers and graphite fibers;
    woven elements of stainless steel fibers and absorbing fibers with a deposit of graphite;
    precursor-coated fabric, wherein the base material is aluminum oxide and/or glass-like;
    a pre-ceramic polymer of solid, paste-like or foam-like consistency;

a fiber-reinforced woven fabric of graphite tape;
a metal-textile composite material;
needle-punched non-woven material;
textured E-glass;
fabric made of ceramic fibers, temperature-resistant support fibers and stainless steel wires; and
polycrystalline or hybrid expanded mats.

12. The decoupling element of claim 2, wherein the damping element extends over at least 20% of an axial length of the exterior hose.

13. The damping element of claim 1, wherein the bulge is formed to extend at least partially circumferentially about an axial direction of the exterior hose.

14. The damping element of claim 1, wherein the damping element is at least in sections rotationally symmetric or substantially cylindrical.

15. The damping element of claim 1, comprising a metal core.

16. The damping element of claim 1, comprising at least one material selected from the group consisting of:
woven elements of stainless steel fibers and graphite fibers;
woven elements of stainless steel fibers and absorbing fibers with a deposit of graphite;
precursor-coated fabric, wherein the base material is aluminum oxide and/or glass-like;
a pre-ceramic polymer of solid, paste-like or foam-like consistency;
a fiber-reinforced woven fabric of graphite tape;
a metal-textile composite material;
needle-punched non-woven material;
textured E-glass;
fabric made of ceramic fibers, temperature-resistant support fibers and stainless steel wires; and
polycrystalline or hybrid expanded mats.

17. The decoupling element of claim 2, comprising two or more damping elements.

18. The decoupling element of claim 2, wherein at least one damping element is arranged on an axial end of the decoupling element.

* * * * *